United States Patent [19]
De Bont et al.

[11] Patent Number: 5,852,158
[45] Date of Patent: Dec. 22, 1998

[54] THERMOPLASTICALLY MOLDABLE COMPOSITIONS

[75] Inventors: Johannes Joachim De Bont, Wouw; Johanes Martinus Dina Goossens, Bergen Op Zoom, both of Netherlands

[73] Assignee: General Electric Company, Pittsfield, Mass.

[21] Appl. No.: 920,967

[22] Filed: Aug. 29, 1997

[51] Int. Cl.$^6$ .................................................. C08G 64/00
[52] U.S. Cl. ........................ 528/198; 524/311; 524/314; 524/315; 525/461; 525/462; 528/196
[58] Field of Search ..................................... 528/196, 198; 525/461, 462; 524/311, 314, 315

[56] References Cited

U.S. PATENT DOCUMENTS

| | | | |
|---|---|---|---|
| 2,999,835 | 9/1961 | Goldberg | 528/196 |
| 3,028,365 | 4/1962 | Schnell et al. | 528/196 |
| 3,169,121 | 2/1965 | Goldberg et al. | 528/196 |
| 3,334,154 | 8/1967 | Kim | 528/196 |
| 3,673,146 | 6/1972 | Factor | 528/196 |
| 3,989,672 | 11/1976 | Vestergaard | 528/196 |
| 4,001,184 | 1/1977 | Scott | 528/196 |
| 4,188,314 | 2/1980 | Fox et al. | 528/196 |
| 4,358,563 | 11/1982 | Quinn et al. | 525/146 |
| 4,381,358 | 4/1983 | Rosenquist | 524/114 |
| 5,210,124 | 5/1993 | Hovatter et al. | 524/311 |
| 5,418,269 | 5/1995 | Ishiwa et al. | 524/315 |

FOREIGN PATENT DOCUMENTS 1567517  5/1980  United Kingdom .

*Primary Examiner*—Terressa Mosley

[57] ABSTRACT

The mold release performance of pentaerythritol esters is enhanced in polycarbonate resin moldings by partial replacement with an ester of dipentaerythritol.

12 Claims, No Drawings

THERMOPLASTICALLY MOLDABLE COMPOSITIONS

BACKGROUND OF THE INVENTION

1. Field of the Invention

The invention relates to thermoplastically moldable polycarbonate resin compositions.

2. Brief Description of Related Art

Injection molding provides a convenient way for preparing various articles from thermoplastic resins, particularly objects of a relatively intricate nature. In order to injection mold articles in an economic manner, it is important to minimize the adhesion of the molded part to the mold surface through the use of a release agent. It is additionally advantageous that the release agent be incorporated in the material to be demolded. However, such an internal agent must be compatible with the resin, that is, it should not lead to any significant loss of the other physical properties such as transparency and melt stability as measured by the usual characteristics of the resin under normal conditions and heat treatments.

Of the thermoplastic resins which find a mold release agent useful from time to time are polycarbonate, copolyestercarbonate and blends of these resins. As a result of the generally high temperature which these thermoplastics are subjected to during molding and the inherent sensitivity of these resins to chemical attack and degradation by additives which are often compatible with many other thermal plastics, it is necessary to select mold release agents with high temperature stability and compatibility with polycarbonates.

One effective mold release additive which has been used are esters of pentaerythritol; see for example the description in British Patent Specification No. 1,567,517 published May 14, 1980. the proportion of ester generally used is within the range of about 0.01 to 3.0 percent by weight of the polycarbonate resin.

We have discovered that the mold release performance of an aromatic polycarbonate containing 0.01 to 3.0 percent of a pentaerythritol ester as a mold release agent is improved by the additional presence of an ester prepared from dipentaerythritol and saturated long chain aliphatic acids. The improvements are seen in lowered quantity release agent required and enhanced release. Thermoplastic compositions of the invention are useful to injection mold a wide variety of articles. The agents do not significantly degrade the molded resin articles, in the proportions employed these resins.

The invention comprises a thermoplastically moldable, synthetic resin composition, which comprises;

a thermoplastically moldable aromatic polycarbonate resin;

an effective mold release proportion of an ester of pentaerythritol; and a mold release enhancing proportion of an ester of dipentaerythritol.

Surprisingly it was found that replacing small amounts of well-known release agents based on pentaerythritol esters with dipentaerythritol-esters (dimer) significantly lowered release force values result.

DETAILED DESCRIPTION OF THE PREFERRED EMBODIMENTS OF THE INVENTION

An effective mold releasing amount of the mold release agent of the invention is employed in the thermoplastic composition of the invention. Any amount of agent which reduces the amount of pressure needed to eject an article from the injection mold and obtain a substantially unblemished article in comparison to the pressure needed to eject a thermoplastic composition control is an effective mold releasing amount. In general, effective amounts of the agent are from about 0.01 to about 3.0 weight percent, based on the quantity of thermoplastic polycarbonate resin, preferably from about 0.05 to about 2.0 weight percent. The agent can be added to the resin in the normal manner that other additives are added and coextruded. Depending upon the volatility of the mold release agent at common processing and extrusion temperatures, an excess may be initially employed in the composition.

A wide variety of compatible (for blending) aromatic polycarbonate resins are well known and are characterized in part by having recurring polymer units of the formula:

wherein each —E— is selected from the group consisting of phenylene, halo-substituted phenylene and alkyl substituted phenylene and A and B are each independently selected from the group consisting of hydrogen, hydrocarbyl radicals free from aliphatic unsaturation and radicals which together with the adjoining

atom form a cycloalkane radical, the total number of carbon atoms in A and B being up to 12.

The above-described aromatic polycarbonate resins may be prepared by methods well known in the art; see for example the method described in U.S. Pat. No. 3,989,672. Thus, they may be prepared in the conventional manner by reacting a dihydric phenol with a carbonate precursor in an interfacial polymerization process. Typical of some of the dihydric phenols that may @be employed are bisphenol-A, (2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)propane, (3,3'-dichloro4,4'-dihydroxyphenyl)-methane, bis 4-hydroxy phenyl sulfone and bis 4-hydroxy phenyl sulfide. Other dihydric phenols of the bisphenol type are also available and are disclosed in U.S. Pat. Nos. 2,999,835; 3,028,365 and 3,334,154. Bisphenol-A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in this invention. Also employed in the practice of this invention may be blends of any of the above materials to provide the aromatic carbonate polymer component.

The carbonate precursor may be either a carbonyl halide, a carbonate ester or a haloformate. The carbonyl halides which can be employed are carbonyl bromide, carbonyl chloride and mixtures thereof. Carbonvl chloride, also known as phosgene, is preferred.

Within the definition of polycarboriate also are copolyester-carbonates, that is the polymer made from a dihydric phenol, a dibasic acid and a phosgene precursor.

The U.S. Pat. No. 3,169,121 discloses such copolyester-carbonates and methods of preparing them.

Also included herein are branched polymers wherein a polyfunctional aromatic compound is reacted with the dihydric phenol and carbonate precursor to provide a thermoplastic randomly branched polycarbonate polymer. The method of their preparation is described in the U.S. Pat. No. 4,001,184, incorporated herein by reference. Also included herein are blends of a linear polymer and a branched polymer.

Preferred polycarbonate resins employed in blends of the invention have an intrinsic viscosity between 0.3 and 1.0 deciliters/gram (dl/g), most preferably from 0.40 to 0.65 dl/g as measured at a temperature of 25° C. in methylene chloride or a like solvent.

The blends of the invention are prepared by well-known methods of their preparation; see for example the description given in U.S. Pat. No. 4,188,314. In general, the blends may be prepared under extrusion conditions (melt blending). The blends may comprise from about 10 to 97 parts by weight of the polycarbonate resin and from 0.01 to 3.0 parts by weight of the mold release additive.

The thermoplastically moldable compositions of the invention are prepared by the method of the invention, which comprises blending into the polycarbonate resin, an effective amount for mold release of esters of pentaerythritol and dipentaerythritol. An effective amount is generally within the range of from about 0.01 to about 3.0 weight percent of resin, preferably 0.05 to 2.0 weight percent (total of both esters). Greater amounts may be used, but generally are unnecessary or undesirable. Higher amounts may result in resin degradation or loss of transparency, particularly at elevated temperatures. The mold release additives may be added to the resin or blend thereof in the same manner as any conventional additive, for example, in the dry state and coextruded or in a solvent and melt extruded with the resin.

Other additives in common use in thermoplastic resins may also be added. For example with respect to blends with an aromatic polycarbonate, additives which are commonly known to stabilize the resin thermally such as a phosphite can be employed. Hydrolytic stabilizers such as epoxides may also be employed as well as agents which are flame retardants, drip inhibitors, ductility enhancers, anti-oxidants, solvent resistance enhancers, ultraviolet light stabilizers and various inert fillers.

Mold-release additive compounds of the type which are esters of pentaerythritol may be exemplified by the general formula:

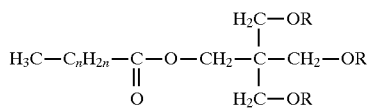

wherein R represents hydrogen or the residue of a fatty acid after the esterification reaction and n is an integer of from 5 to 24.

The esters of pentaerythritol of formula (II) given above are well-known esters prepared by the esterification of pentaerythritol with a saturated aliphatic monocarboxylic or dicarboxylic acid of the formula:

wherein n is as defined above and R' represents hydrogen or COOH. Representative of compounds of the formula (III) are valeric acid, caproic acid, capric acid, lauric acid, myristic acid, palmitic acid, stearic acid, arachidic acid, behenic acid, lignoceric acid, cerotic acid, melissic acid, tetratrioconioic acid, glutaric acid, adipic acid, and azelaic acid. Preferred acids of the formula (III) to esterify pentaerythritol to obtain, for example, the preferred pentaerythritol tetrastearate or pentaerythritol dipalmitate, pentaerythritol dipalmitate distearate and the like are: stearic acid and palmitic acid.

Esters of dipentaerythritol are also well-known and are prepared by esterification of dipentaerythritol with a compound of the formula (III) given above. Representative of esters of dipentaerythritol are those of the general formula:

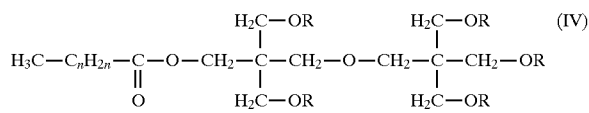

wherein R and n have the meanings previously ascribed to them.

The method of Rydon, J. Chem. Soc. 595, (1936) may be used. Preferred as the esters of dipentaerythritol used in the present invention to enhance the mold release performance of pentaerythritol esters is dipentaerythritolhexastearate or mixtures of dipentaerythritol stearate with dipentaerythritol palmitate. As will be appreciated by those skilled in the art, commercially available stearic acid is not pure and contains proportions of palmitic acid. The esters prepared from stearic acid will inherently contain proportions of the palmitate ester groups. The effective amount of dipentaerythritol ester to enhance mold release is within the range of 0.01 to 0.1 percent by weight of the polycarbonate resin.

The following examples describe the manner and process of making and using the invention and set forth the best mode contemplated by the inventor of carrying out the invention but are not to be construed as limiting the invention. All proportions of the mold releasing additives are in weight percent (parts by weight) of the base thermoplastic resin.

In the ensuing examples the aromatic polycarbonate is LEXAN®140, a polymer produced by reacting bisphenol-A and phosgene and having an intrinsic viscosity at 25° C. in methylene chloride at 25° C. of 0.49–0.52 dl/grams.

EXAMPLE 1

(Control for Purposes of Comparison)

The polycarbonate resin is blended with 0.27 weight percent of pentaerythritoltetrastearate (PETS) (Loxiol P861; Henkel Corp.). The blend was melt extruded and specimens of the extrusion were tested for mold release effectiveness.

Mold release effectiveness was determined in an injection molding machine with a 4 ounce shot capacity. The part molded was a 3"×3" box with a 1½" wall height. It had ejector pins at four corners with two of the pins being attached to strain gauge transducers for measuring the part ejection pressure. The mold was designed with very little draft so that the part would tend to stick to the core unless mold release is used. To vary the amount of shrinkage on the core, the temperature varied. The ejector pin pressure, measured in pounds per square inch, reflects the difficulty of ejecting the part under mold conditions.

The test result is shown in Table 1, below.

EXAMPLES 2–3

The procedure of Example 1, supra., was repeated two times, except that 9.0 weight percent of the PETS was replaced with an equal proportion of dipentaerythritolhexastearate (DPEHS) (Glycolube P; Lonza Corp.) in the blend of Example 2 and 14 to 15 weight percent of the PETS was replaced by an equal proportion of DPEHS in Example 3. The test results are set forth in Table 1, below.

TABLE 1

| Example | Mold Release[1] Additive | Ejector Pin Pressure (PSI) |
|---|---|---|
| Control 1 | Pentaerythritol tetrastearate (PETS) | 1130 |
| 2 | PETS plus DPEHS | 836 |
| 3 | PETS plus DPEHS | 872 |

EXAMPLES 4–5

The general procedure of Examples 2–3 supra., was repeated except that the proportion of pentaerythritolstearate as used in Example 2 was decreased to 0.2 weight percent and the portions of PETS replaced with equal proportion of but varied DPEHS as used in Example 3. The test results are set forth in the Table 2, below, with the proportion of PETS and DPEHS.

TABLE 2

| Example | Mold Release[1] Additive | Ejector Pin Pressure (PSI) |
|---|---|---|
| 4 | 0.19 of PETS Plus 0.01 DPEHS | 844 |
| 5 | 0.185 of PETS Plus 0.015 DPEHS | 788 |
| 3 | 0.18 PETS plus 0.02 DPEHS | 752 |

Partial replacement of the usual pentaerythritol based esters e.g. PETS, by polypentaerythritol esters e.g. DPEHS reduces the needed release pressures during molding of polycarbonate compositions.

We claim:

1. A thermoplastically moldable, synthetic resin composition, which consisting essentially of;
   a thermoplastically moldable aromatic polycarbonate resin;
   an effective mold release proportion of an ester of pentaerythritol; and
   a mold release enhancing proportion of an ester of dipentaerythritol.

2. The composition of claim 1 wherein an effective mold release proportion of an ester of pentaerythritol is within the range of 0.01 to 3.0 weight percent of the polycarbonate resin.

3. The composition of claim 1 wherein a mold release enhancing proportion of an ester of dipentaerythritol is within the range of 0.01 to 0.1 percent by weight of the polycarbonate resin.

4. The composition of claim 1 wherein the ester of pentaerythritol is of the formula:

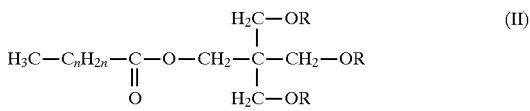

wherein R represents hydrogen or the residue of a fatty acid and n is an integer of from 5 to 24.

5. The composition of claim 1 wherein the ester of pentaerythritol is pentaerythritoltetrastearate.

6. The composition of claim 1 wherein the ester of dipentaerythritol is dipentaerythritolhexastearate.

7. A method for reducing the amount of pressure needed to eject an article from a mold, which comprises:

(a) adding an effective mold release proportion of an ester of pentaerythritol, and an effective mold release enhancing proportion of an ester of dipentaerythritol to a thermoplastically moldable aromatic polycarbonate resin, thereby forming a molding resin;

(b) molding said molding resin in a mold to form a molded article; and (c) ejecting said molded article from said mold.

8. The method of claim 7 wherein an effective mold release proportion of an ester of pentaerythritol is within the range of 0.01 to 3.0 weight percent of the polycarbonate resin.

9. The method of claim 7 wherein a mold release enhancing proportion of an ester of dipentaerythritol is within the range of 0.01 to 0.1 percent by weight of the polycarbonate resin.

10. The method of claim 7 wherein the ester of pentaerythritol is of the formula:

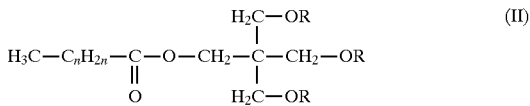

wherein R represents hydrogen or the residue of a fatty acid and n is an integer of from 5 to 24.

11. The method of claim 7 wherein the ester of pentaerythritol is pentaerythritoltetrastearate.

12. The method of claim 7 wherein the ester of dipentaerythritol is dipentaerythritolhexastearate.

* * * * *